United States Patent [19]

Pierce et al.

[11] 4,395,590
[45] Jul. 26, 1983

[54] LINE POWERED MODEM

[75] Inventors: O. Leon Pierce; Mark C. Smith; R. Byron Driver, all of Huntsville, Ala.

[73] Assignee: Universal Data Systems, Inc., Huntsville, Ala.

[21] Appl. No.: 203,108

[22] Filed: Nov. 3, 1980

[51] Int. Cl.³ ............................................ H04M 19/00
[52] U.S. Cl. ................................. 179/2 DP; 375/8
[58] Field of Search .................. 179/2 DP, 70, 77; 375/8

[56] References Cited

U.S. PATENT DOCUMENTS 3,539,727  2/1969  Pasternack ..................... 179/2 DP
4,171,467  10/1979  Evenchik ..................... 179/2 DP X

OTHER PUBLICATIONS

The Bell System Data Set catalog, pp. 2-56.
Bell Systems Data Set 113A product literature, Description and Operation; pp. 1-6, Installation and Connection, pp. 1-7; and Test Procedure, pp. 1-4.

Primary Examiner—G. Z. Rubinson
Assistant Examiner—James L. Dwyer
Attorney, Agent, or Firm—Weingarten, Schurgin, Gagnebin & Hayes

[57] ABSTRACT

A modem for coupling a data terminal or other apparatus to a telephone line and deriving its operating power for both transmitting and receiving operation from the telephone line, and providing electrical isolation between the telephone line and the data terminal.

20 Claims, 6 Drawing Figures

LINE POWERED MODEM

FIELD OF THE INVENTION

This invention relates to data modems for coupling data to and from a telephone line, and more particularly to a modem which derives its operating power from the telephone line.

BACKGROUND OF THE INVENTION

For data transmission on a standard voice grade telephone line a modem is employed which is operative to modulate data in a form suitable for transmission along the telephone line, and to demodulate data received from the telephone line to reproduce the data transmitted from a remote site. The modem requires a power supply for energizing its electronic circuits and this power supply is usually operative from an AC power outlet or a battery source.

In many instances an AC power source is not conveniently available, and, in the case of a battery source, the modem may be at a location where battery monitoring or replacement is inconvenient. In addition, the power supply adds to the expense and size of a modem. It would be advantageous to provide power for operation of the modem circuits from the telephone line itself to thereby dispense with the need for any separate modem power supply or access to a separate power source.

The connection of modems to the telephone network is governed by FCC and Bell System regulations and specifications which set forth stringent engineering specifications which must be met for certification of such apparatus for connection to the telephone network. Meeting such specifications by circuits powered only from the telephone line becomes a difficult task, since the operating parameters and circuit configuration of the modem circuits at the extremely low power levels available from the telephone line are rather critical.

In U.S. Pat. No. 3,539,727 a data receiver is described which has a power supply energized by the telephone line and isolated from the line. This patent does not disclose a fully operational modem powered by the telephone line. The power supply includes a regulator circuit which provides DC power derived from the telephone line to the receiver circuits. Frequency shift data signals from the line are applied to a locked oscillator which provides limited AC signals of a frequency which is locked to the received data signal frequency. A discriminator provides recovered data from the limited signal and operates an output switch which produces data signal voltages as an output. The limited AC signal is also applied as an input to a converter circuit which produces DC power for the output switch.

SUMMARY OF THE INVENTION

In accordance with this invention, a modem is provided which derives its entire operating power from the available telephone line power and which is electrically isolated from the telephone line and from a data terminal or other utilization apparatus to which it is connected. The modem includes an interface and power source for coupling signals from the telephone line for demodulation by the modem and signals from the modem to the telephone line for transmission. This interface and power source provides regulated operating voltages for the entire modem and at a minimum current sufficient to hold the telephone line in an off hook condition. This power source provides a low DC resistance and a high AC impedance sufficient to substantially match the telephone line impedance. The modem exhibits very low power consumption well within the 160 milliwatts of available power from the telephone line, and meets all present specifications and regulations of the telephone system and FCC.

DESCRIPTION OF THE DRAWINGS

The invention will be more fully understood from the following detailed description taken in conjunction with the accompanying drawings, in which.

DETAILED DESCRIPTION OF THE INVENTION

Figures 1, 5:
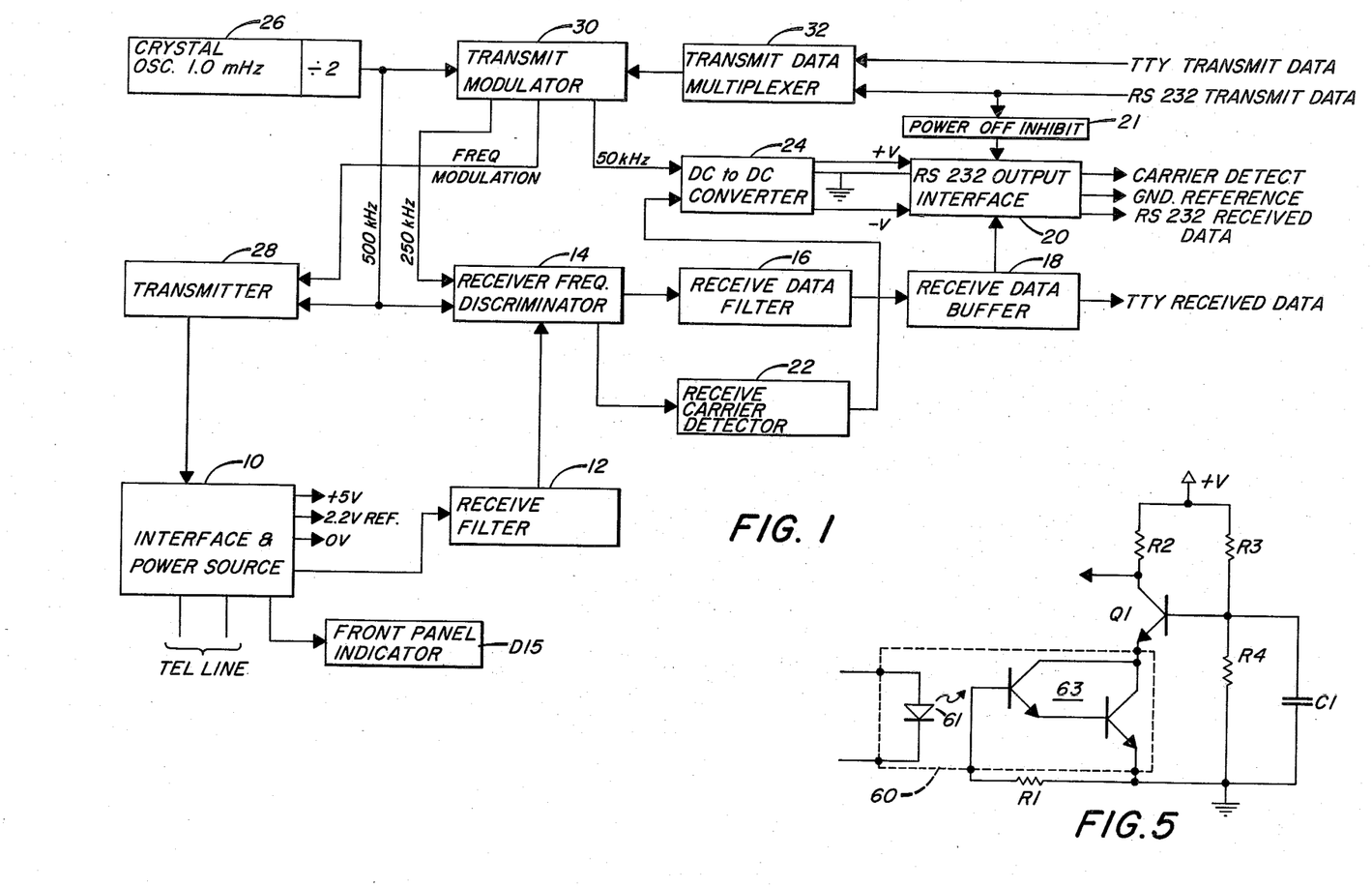
FIG. 1 is a block diagram of a preferred embodiment of a line-powered modem in accordance with the invention.
FIG. 5 is a schematic diagram of an electro-optical isolator employed in the modem of FIG. 1.

A line powered modem embodying the present invention is shown in FIG. 1. In the illustrated embodiment the modem is a type 103 modem which provides full duplex operation at transmitting and receiving rates up to 300 bits per second (baud) and employing two level frequency shift keyed (FSK) modulation. Two carrier frequencies are employed, one for transmission at a center frequency of 1170 Hz and the other for reception at a center frequency of 2125 Hz. To minimize power consumption, the modem is constructed of CMOS digital integrated circuits which have inherently low current requirements. The CMOS circuits are also relatively inexpensive, thereby permitting economical construction. The modem employs digital signal processing including digital synthesis of the transmitted frequencies and digital discrimination of the received frequencies to achieve highly accurate frequency stability at low power levels and in a compact and relatively inexpensive manner.

The modem is connected to and fully powered by the telephone line, and is also connected to a data terminal, business machine or other apparatus to and from which data is transferred. The modem provides electrical isolation between the telephone line and the utilization apparatus. The telephone line is connected to a telephone line interface and power source 10 which provides operating power derived from the telephone line to all modem circuits. This interface circuit 10 also couples signals from the telephone line for demodulation by the modem, and signals from the modem to the telephone line for transmission. In order to hold the telephone line in an off hook condition, a current in the range of 20–150 milliamperes must be drawn. The minimum load requirements for the telephone line are specified to be 8 volts drop at 20 milliamperes. As a result, the telephone line can provide a minimum of 160 milliwatts of power to circuitry connected thereto. An input impedance of 600 ohms must also be maintained to accord with telephone specifications. The modem described herein has a minimum power requirement of 8 volts at 17 milliamperes, or 136 milliwatts. This very low power consumption is well within the 160 milliwatts limit of available power from the telephone line.

The telephone line has a specified nominal DC level of 48 volts and a DC equivalent series resistance (minimum source resistance) of 400 ohms. The actual DC current on a particular line will depend on the resistance of that particular line, which is a function of the length of the line from the central office power source. Typically, the equivalent line resistance can be from near zero to about 1200 ohms. For the illustrated type 103 modem, the interface and power source 10 provides a regulated 5 volt output with respect to a common terminal and a regulated 2.2 volt output with respect to the common terminal which is employed as a reference voltage in the modem. The 2.2 volt reference is employed in the shunt regulator of the power source and as a voltage bias for the receiver operation. The circuit 10 is also operative to couple audio data signals received on the telephone line to the modem receiver, and to couple data signals from the modem transmitter to the telephone line for transmission to a remote receiver.

The interface and power source 10 can be considered as a shunt regulator across the load and a current regulator in series with the load. The shunt regulator functions much like a Zener diode and provides a voltage level which is substantially constant irrespective of variations in applied current. The current regulator provides a low DC resistance of about 10–20 ohms, and provides an AC impedance which is relatively high such that audio variations in line voltage cause no appreciable current change through the load. This current regulator serves as an active electronic circuit equivalent to the large inductor which would normally be required to separate the audio signals from the DC telephone line current.

Referring to FIG. 1, received signals from the telephone line are coupled by interface and power source 10 to a receive filter 12 which is a bandpass filter operative to limit the received signal spectrum to the desired band which is usually specified to be approximately 350 Hz centered at a frequency of 2125 Hz. The filter 12 includes an amplifier to provide an amplified output signal which is applied to a receiver frequency discriminator 14. This frequency discriminator includes a digital phase lock loop and is operative to provide a digital signal having a duty cycle representing the frequency of the signal from filter 12. The variable duty cycle signal is applied to a receive data filter 16 which removes unwanted harmonics and averages the variable duty cycle input signal to produce an output which is a linearly varying voltage which is directly proportional to the frequency of the received signal.

This signal from the data filter 16 is applied to a receive data buffer 18 which provides as an output TTY (teletypewriter) received data. The data buffer 18 also provides an output signal to an RS232 output interface 20 which provides as an output RS232 received data and a carrier detect signal. The receive data buffer 18 includes a slicer circuit operative to determine whether the voltage corresponds to a frequency above or below the 2125 Hz center frequency of the receiver band. If the analog voltage denotes a frequency above 2125 Hz, the data buffer 18 provides a voltage output level at the mark state. If the voltage denotes a frequency below 2125 Hz, the data buffer 18 provides an output voltage level at the space state.

The received data is provided by way of electro-optical isolators which achieve complete electrical isolation between the modem and the associated utilization apparatus. The data buffer 18 includes two electro-optical isolators which are part of an output buffer. One isolator is employed to provide a current switched between two levels, depending upon the mark or space state of the received data, for TTY equipment. The other isolator is employed to provide an RS232 data output by way of interface 20. The output interface 20 also provides a carrier detect signal in the presence of a valid carrier being received. In the 103 modem two criteria are employed for determining the validity of a received carrier. If there is sufficient energy in the receiver band, the presence of that energy is assumed to be a carrier from the transmitting site. Normally the level of discrimination is of the order of −46 DBM. Thus, if the received signal energy exceeds −46 DBM, and the frequency of the received energy is within a band of about 400 Hz centered at 2150 Hz, it is recognized to be a valid carrier.

The frequency discriminator 14 includes a level detector operative to detect signals above a predetermined level, and also includes circuitry for sensing within a predetermined frequency band. Typically, the threshold level of the discriminator is about −45 DBM and the frequency range is about 1950–2350 Hz. For recognition of a valid carrier signal, the signal level must exceed the discriminator threshold level and be within the discriminator band. The discriminator 14 provides to the carrier detector 22 a signal of one binary level upon detection of a valid carrier, and of a second binary level if no carrier is present or does not meet the detection criteria. Thus, the carrier detector 22 receives a bilevel signal from the frequency discriminator 14 indicative of the presence or absence of a valid carrier, and provides an enable signal to DC to DC converter 24 in the presence of a valid carrier signal. The converter 24 is driven by an unbalanced 50 kHz square wave signal from transmit modulator 30. The 50 kHz unbalanced signal has a duty cycle of 60 percent positive and 40 percent negative cycles.

The DC to DC converter 24 is operative to convert the 5 volt power signal derived from the telephone line to the voltages used to drive the RS232 interface circuit 20 which provides the interface signals to be applied to the associated utilization apparatus. The converter furnishes the minimum power necessary to ensure that the interface signals are of sufficient signal level to be properly received by the business machine or other utilization apparatus. The voltages provided by the converter are offset in the positive direction, since most RS232 receivers have a positive threshold in the range of +0.5 to 1.0 volt. The interface circuit 20 provides the carrier detect output signal and the RS232 received data signal to be applied to the associated apparatus. The RS232 interface is specified to have a minimum voltage of +3 volts or −3 volts, depending on the state of the output, and a minimum load of 3K ohms. This requires a minimum of about 1 milliampere of current.

Figure 3:
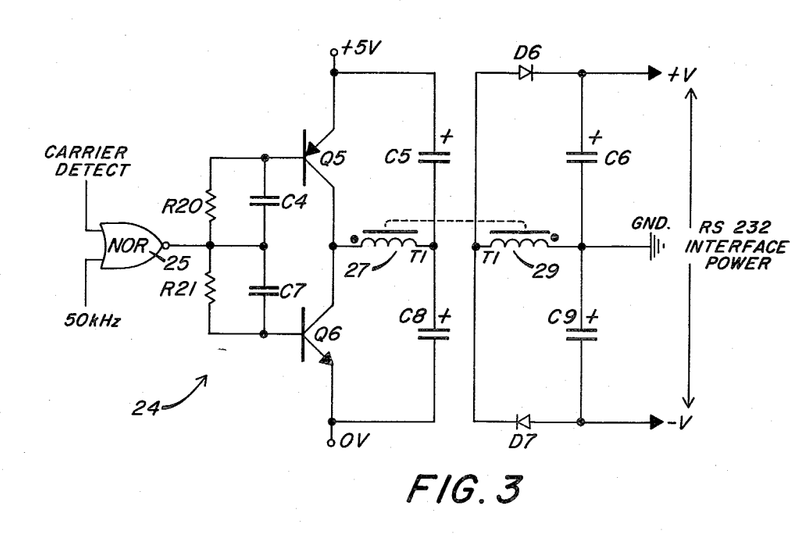
FIG. 3 is a schematic diagram of the DC to DC converter 24 of FIG. 1.

The DC to DC converter 24 is shown in FIG. 3. The carrier detect signal from received carrier detector 22, and the 50 kHz square wave from transmit modulator 30 are applied via a NOR gate 25 to the base electrodes of respective transistors Q5 and Q6 via RC networks composed, respectively, of resistor R20 and capacitor C4, and resistor R21 and capacitor C7. The collectors of transistors Q5 and Q6 are connected to one end of a first transformer winding 27, the other end of which is connected via a capacitor C5 to the emitter of transistor Q5 and via a capacitor C8 to the emitter of transistor Q6. The secondary winding 29 of transformer T1 is connected to anode of a diode D6 and to the cathode of a diode D7. The cathode of diode D6 is connected via a capacitor C6 to the other end of winding 29 and which is also connected via a capacitor C9 to the anode of diode D7. The two winding transformer T1 provides electrical isolation between the telephone line and the utilization apparatus to which the modem is connected. The primary winding of the transformer is driven by a 5 volt peak-to-peak square wave at a frequency of 50 kHz having an unbalanced duty cycle of 60 percent positive and 40 percent negative cycles. The voltage at the junction of capacitors C5 and C8 will assume the average of the voltage excursions, which is about +3 volts. The transfomer secondary has a voltage step-up ratio of about 2:1 and will provide an unbalanced voltage output of about +6 volts and about −4 volts which are rectified by diodes D6 and D7 to furnish about +5.5 volts and −3.5 volts to operate the RS232 interface 20.

Figure 2:
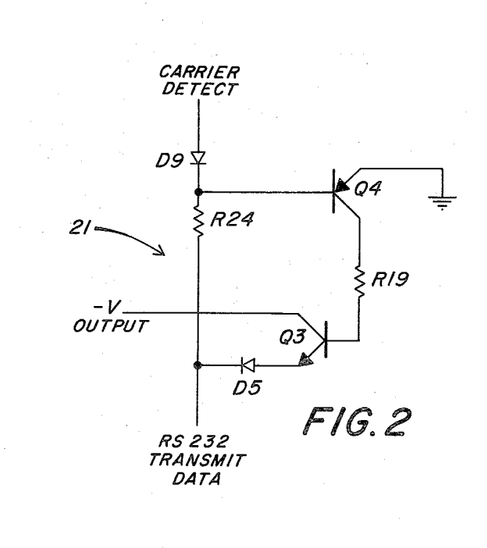
FIG. 2 is a schematic diagram of the power off inhibit circuit 21 of FIG. 1.

To meet standard RS232 operating requirements, it is often required that the carrier detect and data signals be at a negative voltage to indicate a mark or off state even when no data is being sent or received. If the telephone line were not connected to the modem, the modem could not furnish any power to the interface circuit 20. In this instance, the RS232 transmit data is held in a mark state and a power off inhibit circuit 21 automatically applies this negative (mark) voltage to the negative supply input of interface circuit 20, thereby to permit the interface circuit to provide the carrier detect and received data outputs in a mark or off state. The power off inhibit circuit 21 is shown in FIG. 2. When the modem is powered and the carrier detect signal is present, the transistors Q4 and Q3 are non-conductive and the circuit is disabled. When the modem is not powered or the carrier detect signal is not present, and therefore no power is applied to interface circuit 20, the mark or negative state of the RS232 transmit data signal causes transistors Q3 and Q4 to conduct and permits a negative output voltage to be provided to interface circuit 20. The mark level is specified to be in the range of −5 to −15 volts, and is usually in the range of −6 to −12 volts, and a corresponding negative voltage within these operating ranges is provided at the collector of transistor Q3. Thus, when the modem is not powered by the telephone line, the data terminal from the associated data apparatus provides the negative voltage to power the interface circuit 20 to permit it to provide the carrier detect and received data outputs in a mark state.

Master timing is provided by a crystal oscillator and frequency divider circuit 26. The crystal oscillator is operative at 1 mHz and, after division, provides a 500 kHz clock signal to receiver frequency discriminator 14 and to transmitter 28 and modulator 30. A 1 mHz crystal is employed to implement the oscillator with available CMOS circuits operable at a voltage level of 5 volts for the intended signal rates. Since the maximum resolution required by the digital circuits is not more than 500 kHz, the 1 mHz crystal oscillator frequency is divided by a factor of two to provide a 500 kHz clock signal.

The transmitter frequency of 1170 Hz is digitally synthesized and provided by the transmitter 28. The FSK modulation is provided by transmit modulator 30. The TTY data or RS232 data to be transmitted is applied to a data multiplexer 32 which provides the data to modulator 30. The modulator is operative to frequency shift the transmitter carrier in a phase coherent manner to provide the FSK modulated signal which is applied via interface 10 to the telephone line for transmission to a compatible modem at the other end of the line. The modulator also provides a 50 kHz unbalanced square wave signal to drive the DC to DC converter. The modulator also provides a 250 kHz clock signal to the receiver frequency discriminator 14. The transmitter 28 includes a sinewave synthesizer, digital counters and digital-to-analog converter to generate an analog signal which after appropriate filtering is applied to the telephone line for transmission. The transmitted frequency is 1170 Hz±the frequency deviation caused by the mark or space states of the transmitted data.

Figure 4:
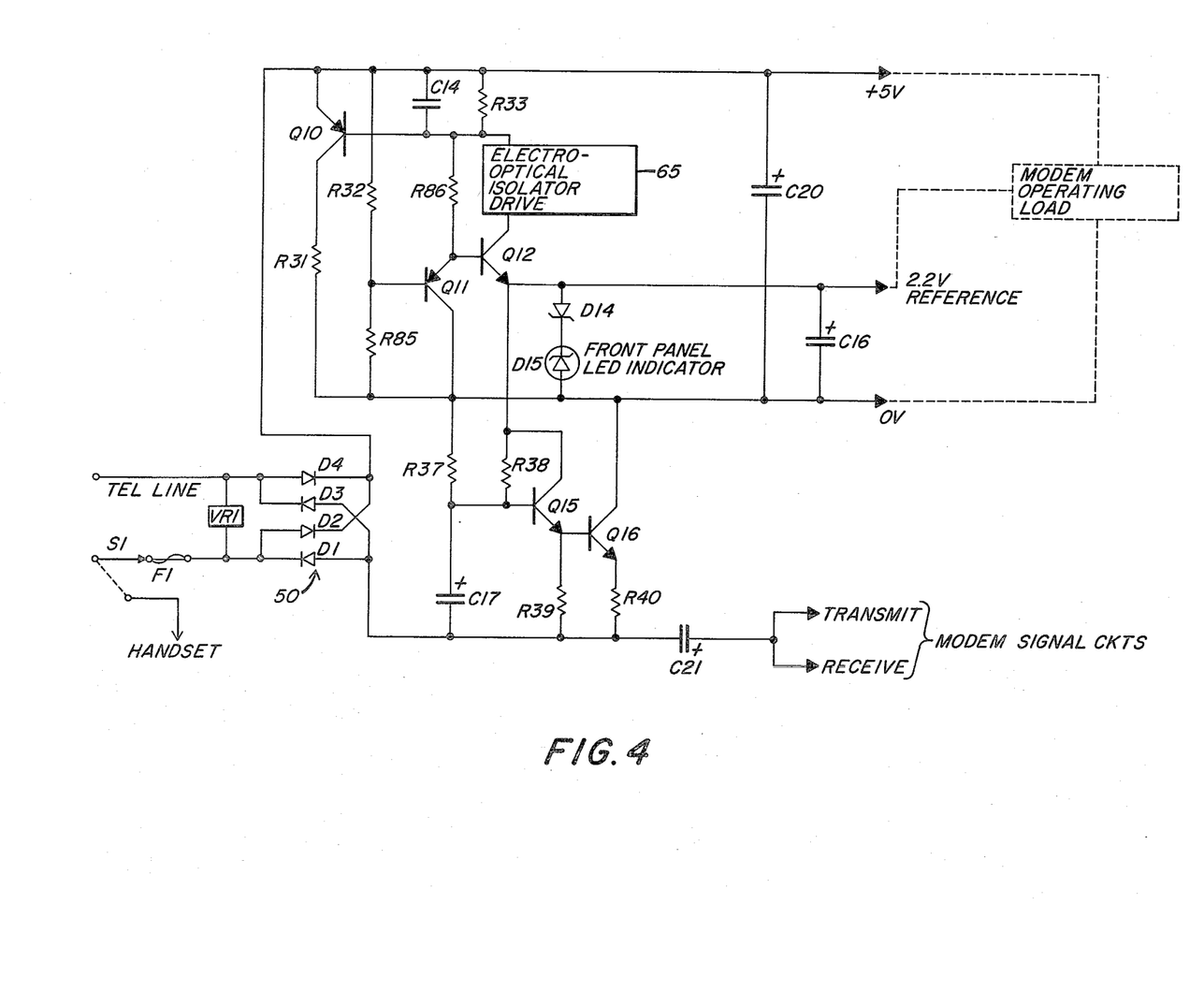
FIG. 4 is a schematic diagram of the interface and power source 10 of FIG. 1.

The interface and power source 10 is shown in FIG. 4 and includes an input circuit having a switch S1 which selects routing of the telephone line between the modem and the telephone handset which is employed to complete a call. A fuse F1 protects the modem from high currents that can be caused by ligtning strikes or transients on the telephone line, and a varistor VR1 serves to limit the voltage across the modem input to prevent application of any breakdown voltages to the modem. Typically, the voltage is limited to be less than 22–30 volts. The telephone line is connected via switch S1 and the protective elements to a bridge 50 composed of diodes D1 through D4 and which functions as a polarity guard to permit the modem to receive correctly polarized DC current from the telephone line even though the line may be reversed from its usual polarity.

The transistors Q10, Q11, and Q12 and the associated components function as a shunt regulator to maintain a constant voltage across the modem circuits, which are the load, and to shunt any excess current above that required by the load. The transistors Q15 and Q16 and associated components function as a constant current source to block AC current and pass DC current. The audio data signals are AC coupled to or from the telephone line by means of a capacitor C21. The received signals are applied to the receive filter 12 (FIG. 1), and the transmit signals are provided by the transmitter 28 (FIG. 1). The circuit of FIG. 4 also limits the voltage drop on the telephone line to ensure a mimimum of 20 milliamperes of DC line current. An electro-optical isolator drive circuit 65 is driven by the collector current of transistor Q12 and is operative to drive the LEDs of the two isolators which are within receive data buffer 18.

The frequency response of the circuit is such that it is an active equivalent of a large inductor. It has a low resistance to DC current (20 to 30 ohms) but its impedance to audio frequency currents is sufficiently high (greater than 10K ohms) to prevent degradation of the AC impedance of 600 ohms necessary to match the telephone line impedance. Thus, the circuit will pass whatever DC current is available from the phone line (20 milliamperes to 100 milliamperes), but will block any AC currents associated with this audio signal on the line. An inductor to provide such AC blocking while passing such DC currents would be so physically large and/or expensive as to be impractical in this application. This is done by providing the relatively large (1 microfarad) capacitor C17 to stabilize the base-emitter voltages of Q15 and Q16 at the DC line current available. Since C17 can only charge or discharge through R37

(typically 100K ohms), R38 (typically 470K ohms), and the high base resistance of Q15, the response to voltage changes is too slow to significantly follow audio signals above 100 Hz.

Initially, when the telephone line is connected, current begins to flow through resistor R37, and capacitor C17 is charged with available voltage within a few milliseconds. The charged capacitor provides a forward bias of the base-emitter junctions of the transistor pair Q15 and Q16, which causes current to flow in the collector-emitter junction of transistor Q16. The base-emitter voltage on the transistor pair reaches its saturation point of about 1.4–1.6 volts and most of the available current from the telephone line is passed through the collector-emitter junction of transistor Q16. This current flows to the shunt regulator and to the load, and any excess current not required by the load is shunted through the shunt regulator. The voltage drop across the line is composed of the 5 volts of the shunt register, the voltage across resistor R37, and the base-emitter drops of the transistor pair, and about 1.6 volts drop in the polarity guard, which totals about 7.9 volts at a line current of 20 milliamperes. Rapidly changing voltages on the telephone line will not permit capacitor C17 to change voltage, therefore the collector-emitter current of transistor Q16 remains relatively constant and the AC impedance remains constant at a high level, typically higher than 10K ohms. The transistors Q15 and Q16 are connected in a modified Darlington configuration providing substantial current gain. This configuration permits the use of a capacitor C17 of small value, typically 1 microfarad, which can also be physically small. Since only a small amount of current need be supplied to the base of transistor Q15, the resistor R37 can be of large value, typically 100K ohms. The resulting AC impedance across the Darlington pair is therefore high.

The modified Darlington configuration provided by transistors Q15 and Q16 provides the desired current regulation with the minimum voltage drop which will provide the intended constant current characteristics. The transistor Q16 serves as the primary current sink, while transistor Q15 serves as a current buffer between the base of transistor Q16 and the AC coupling circuit composed of resistor R37 and capacitor C17. The collector of transistor Q15 is connected to the reference voltage at the emitter of transistor Q12 which permits the transistor Q15 to maintain an operating voltage of 2–3 volts for efficient current amplifier operation. The resistor R38 between the base and collector of transistor Q15 in conjunction with the resistor R37 biases the voltage at the base of transistor Q15, allowing a decrease in the voltage across transistor Q16. The voltage across transistor Q16 is reduced by about 0.5–1 volt which reduces the total voltage drop across the telephone line to assure that the total voltage drop is below the maximum specified telephone line drop of 8 volts at the minimum line current of 20 milliamperes. The resistors R39 and R40 provide biasing of the respective transistors to limit the buffering characteristics of transistor Q15 and stabilize the AC resistance characteristics of transistor Q16 to minimize harmonic distortion which can interfere with modem performance.

The transistors Q11 and Q12 are also connected in modified Darlington configuration, with these transistors being of complementary PNP and NPN types. The base-emitter voltages of these transistors tend to cancel one another, and as a result the voltage at the base of transistor Q11 tends to remain equal to the voltage at the emitter of transistors Q12. The voltage across the combination of diodes D14 and D15, which is about 2.2 volts, serves as a voltage reference for the emitter of transistor Q12. The light emitting diode (LED) D15 serves as a reference diode having a Zener voltage of about 1.6 volts. This LED (D15) also serves as a front panel lamp to indicate an off hook condition. Additionally, this LED (D15) is part of the current path for the isolator drive 65, which current path also energizes the LED for its indicator function. The values of resistors R32 and R85 are selected to establish the ratio of the regulated 5 volts to the 2.2 volt reference voltage. If the voltage at the base of transistor Q11 is 2.2 volts, equal to the voltage at the emitter of transistor Q12, the total voltage drop across the divider composed of resistors R32 and R85 is 5 volts. This portion of the circuit therefore functions as a shunt regulator operative to provide the regulated operating voltages of 5 volts and 2.2 volts. This constant voltage is maintained for any value of current flow over the operating range.

If the current changed appreciably, say from 20 to 120 milliamperes, the reference voltage could change appreciably, if all the current were allowed to flow through the reference diodes. This is prevented by an additional current shunt composed of transistor Q10, resistors R31 and R33, and capacitor C14. When the current flow through transistor Q12 reaches a level such that the voltage drop across resistor R33 is sufficient to forward bias transistor Q10, this transistor becomes conductive and shunts any additional current through the shunt path composed of transistor Q10 and resistor R31, rather than allowing the additional current flow through transistor Q12 and the diode pair. Thus for increased currents above a predetermined level, such increased currents are shunted by transistor Q10, and voltage at the emitter of transistor Q12 remains substantially constant.

Electro-optical isolators are employed to isolate the telephone line from the utilization equipment. Two isolators are provided in the transmit data multiplexer 32, one for TTY transmit data and the other for RS232 transmit data. Two isolators are also provided in the receive data buffer 18 for the TTY received data, and RS232 received data, respectively. The isolator circuits are substantially identical and each are as shown in FIG. 5. The electro-optical isolator 60 includes an LED 61 which provides light signals in response to applied electrical signals, and a phototransistor pair 63 providing a corresponding electrical output signal in response to received light signals from the LED. This isolator can be a commercial solid state microcircuit isolator such as an Optron OPI 3250. The isolator 60 has a relatively slow speed of response to the low available current levels. The circuit of FIG. 5 provides the necessary improvement in response time to meet the rise and fall time requirements of the modem logic circuitry which are of the order of 10 microseconds. The increased speed is achieved without increase in the low current drive to the isolator LED.

The isolators used have sufficient gain but suffer from a relatively slow response time when used in the normal configuration. This is caused by the fact that, while the optical transistor base charge is created by the light from the LED when turned on, that stored charge must be allowed to bleed off in order to turn the transistor off. If the only path for dissipation is through the high impedance base-emitter junctions the process is likely to take hundreds of microseconds. This is further compounded in normal configuration by so-called Miller effect capacitance or the collector-base capacitance of the transistor. Any large changes in voltage at the collector cause a current to flow through that spurious capacitance to the base and the current always opposes the turn-off operation. This is normally offset by adding a resistor from base to emitter to provide an alternate path for dissipating base charge. However, it is then required that the LED must be brighter (more LED drive current) to furnish the added current in the resistor while the transistor is on. The capacitance from collector to base cannot be eliminated, but it is possible to reduce by several orders of magnitude the change in collector voltage which causes the opposing current flow.

The circuit of FIG. 5 accomplishes this by providing transistor Q1 to guard the collector of the isolator from the large voltage changes necesary to transmit the logic signals. The circuit Q1, R2, R3, R4, and C1 comprise a grounded base amplifier for AC signals. When the isolator is turned on, current is furnished to the emitter of Q1. The current is passed through Q1 to the collector of resistor R2 which is of the order of 20 K ohms. A large change in Q1 collector voltage is generated by a few hundred microamps of current. Since the emitter of Q1 is a very low impedance, only a few millivolts of change in emitter voltage is necessary to generate several volts of collector voltage change. The emitter of Q1 is driven by the collector of the opto-transistor which now has only a few millivolts of change during turn-on and turn-off rather than the several volts present in the normal configuration. The "guarding" technique almost eliminates the Miller effect and improves low current operating speed by as much as a hundred fold.

The resistors R3 and R4 furnish base drive to Q1 just sufficient to maintain conduction of Q1 in the "on" state. The capacitor C1 prevents rapid changes in Q1 base voltage which would cause greater changes in the emitter voltage. A resistor R1 (typically 15 megohms) is provided in the base of this isolator but is necessary only to prevent spurious turn-on due to the capacitive coupling of common mode current when large differences in voltage exist between LED and transistor (e.g., 150 volts at 60 Hz commonly present on the telephone line).

By using the guard circuit techniques above, the inexpensive opto-isolator can be utilized at low (1 to 2 milliamperes) LED drive levels to achieved response times less than 10 microseconds.

Figure 6:
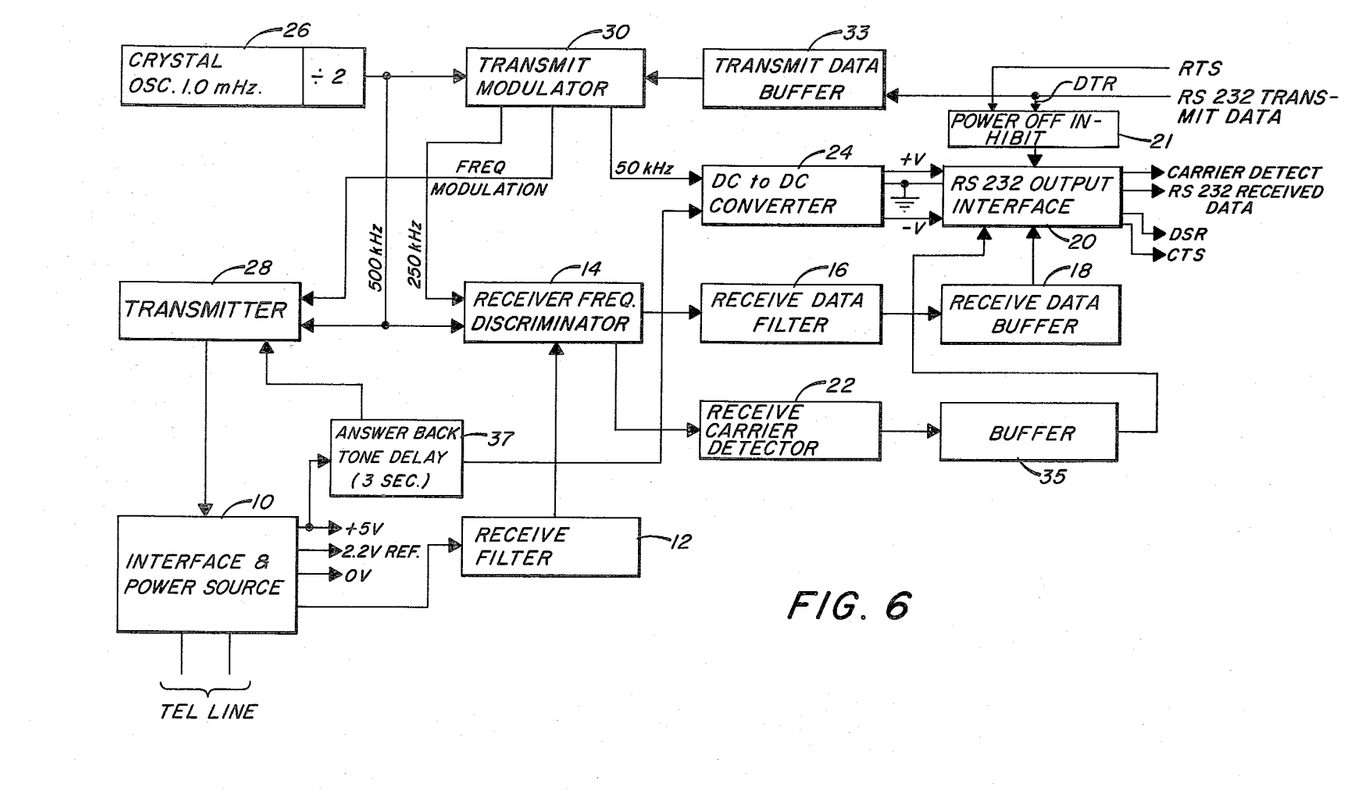
FIG. 6 is a block diagram of an alternative embodiment of the invention.

While the invention has been described in exemplary embodiment in a 103 modem, it is contemplated that other modems can be implemented in line powered form in accordance with the invention. As an example, a type 202 modem is depicted in FIG. 6 embodying the invention. The 202 modem is a frequency shift keyed modem with a data rate up to 1,200 bits per second. This 202 modem operates in a half duplex mode wherein transmission and reception occur at separate times and not simultaneously, as in a full duplex modem. Thus, the transmitter must be turned off when the modem is in a receiving state, and the receiver must be inhibited when the modem is in a transmitting state. Since the data rates are higher than usually employed by TTY equipment, the 202 modem is not employed with TTY data. Referring to FIG. 6, is is seen that the modem is generally similar to the modem of FIG. 1, and only the differences between these two types will be discussed. A request to send (RTS) signal and RS232 transmit data are applied to a transmit data buffer 33. A data terminal ready (DTR) signal is applied to the power off inhibit circuit 21 which also receives the RTS signal. The RS232 output interface 20 provides, in addition to the carrier detect signal and received data signal, a data set ready (DSR) and a clear to send (CTS) signal. Thus, this 202 modem provides and receives the appropriate half duplex commands as are conventionally employed in such half duplex operation. The receive carrier detector 22 provides its output signal to a buffer 35, the output of which is applied to the interface circuit 20. An answerback tone delay circuit 37 provides an output signal to transmitter 28 and to DC to DC converter 24. Upon connection of the modem to the telephone line, a 3-second delay interval is provided by delay circuit 37, and during this interval, the transmitter 28 is caused to send a requisite tone of selected frequency. At the end of the delay interval, the DC to DC converter 24 is enabled, causes the interface circuit 20 to provide the DSR signal to the utilization apparatus. If the modem is not connected to the telephone line, and if either the RTS signal, the transmit data signal, or the DTR signal are inhibited or false, the circuit 21 will cause the supply of a negative voltage to interface circuit 20 to force all outputs to the negative state. The modem operation is otherwise substantially as described above.

The invention is not to be limited by what has been particularly shown and described, except as indicated in the appended claims.

What is claimed is:

1. A telephone line powered modem comprising:
   a first circuit for coupling to a telephone line and operative wholly in response to telephone line power to provide operating power for all modem circuits;
   said first circuit including a solid state shunt regulator circuit providing a voltage which is substantially constant irrespective of variations in current from the telephone line, and a current source operating as a constant current source for AC and self adjusting for DC current and operative to provide a low DC resistance and high AC impedance such that audio frequency variations in line voltage cause no appreciable current change through the load;
   a modem receiver subsystem powered by the first circuit and operative to provide data signals derived from signals received on the telephone line; and
   a modem transmitter subsystem powered by the first circuit and operative in response to data from a source to provide modulated data signals to the telephone line.

2. The modem of claim 1 wherein said receiver subsystem includes:
   filter means operative to limit the received signal spectrum to a desired frequency band;
   a frequency discriminator operative to provide a digital signal having a duty cycle representing the frequency of the signal from the filter means;
   a data filter operative to provide an output voltage which is directly proportional to the frequency of the received signal; and
   output means operative to provide one or more output signals of predetermined form.

3. The modem of claim 2 wherein said output means includes:
   a data buffer operative to provide an output TTY data signal.

4. The modem of claim 3 wherein said output means includes:
an RS232 output interface operative to provide RS232 data signals and a carrier detect signal.

5. The modem of claim 2 wherein said output means includes:
a data buffer operative to provide an output TTY data signal and operative to provide a control signal representative of the mark or space state of the received data;
an RS232 output interface operative in response to the control signal from the data buffer to provide RS 232 data signals and a carrier detect signal;
the data buffer including electro-optical isolators for electrically isolating the modem and utilization apparatus;
a carrier detector operative in response to a signal from the frequency discriminator to provide an output signal representative of valid carrier presence or absence; and
DC to DC converter means enabled in response to a signal from the carrier detector representing valid carrier presence and operative to provide the minimum power to the RS232 output interface necessary to ensure that the interface output signals are of sufficient signal level.

6. The modem of claim 5 wherein the DC to DC converter means includes:
means for providing an unbalanced square wave signal;
a transformer having a primary winding and a secondary winding;
electronic switching means coupling the unbalanced square wave signal to the primary winding; and
a rectifier circuit connected to the secondary winding and providing an unbalanced voltage output.

7. The modem of claim 6 wherein the electronic switching means includes:
first and second transistors, each having a collector connected to one terminal of the primary winding;
a pair of capacitors, each coupling the other terminal of the primary winding to the emitter of a respective one of the transistors;
first and second RC networks, each coupling the base of a respective one of the transistors to the unbalanced square wave signal;
first and second diodes connected between one terminal of the secondary winding and respective converter output terminals; and
first and second capacitors coupling the other terminal of the secondary winding to respective converter output terminals.

8. The modem of claim 4 including:
means operative to provide a negative voltage to the RS232 output interface to permit the interface to provide the carrier detect and received data outputs in a mark state when no data is being sent or received;
said means including:
electronic switch means connected to the RS232 transmit data terminal and to the carrier detect terminal and operative in the absence of a carrier detect signal or the absence of power from the telephone line to provide a negative output voltage to the interface circuit, this voltage being derived from the mark state signal being providing to the RS232 transmit data terminal.

9. The modem of claim 5 wherein said transmitter subsystem includes:
a transmitter operative to provide data to the telephone line for transmission to a receiving site;
a modulator operative to modulate the transmitter carrier; and
timing means including a crystal oscillator and providing clock signals to the transmitter and modulator.

10. The modem of claim 1 wherein said first circuit includes:
a switch selectively coupling the modem to the telephone line;
circuit protector means operative to protect the modem from high currents which may be present on the telephone line and from overvoltages which may be present on the telephone line; and
a bridge circuit serving as a polarity guard to permit correctly polarized DC current from the telephone line to be applied to the modem.

11. The modem of claim 9 wherein said transmitter subsystem includes:
a data buffer having electro-optical isolators by which TTY and RS232 data signals are coupled to the modulator.

12. The modem of claim 1 wherein said first circuit includes means operative to limit the voltage drop on the telephone line to ensure a predetermined minimum DC line current sufficient to maintain an off hook condition.

13. The modem of claim 1 wherein the total power consumption of said modem circuits is less than 160 milliwatts.

14. The modem of claim 8 wherein said first circuit includes means providing electrical isolation between the telephone line and the data terminal.

15. For use in a telephone line powered modem which includes a receiver operative to provide data signals derived from signals received on a telephone line, and a transmitter operative in response to data from a source to provide modulated data signals for transmission on the telephone line, a circuit operative wholly in response to telephone line power to provide operating power for itself and said transmitter and receiver, said circuit comprising:
first means for providing substantially constant operating voltages for the modem and minimum current sufficient to hold the telephone line in an off hook condition; and
second means providing a low DC resistance and a high AC impedance substantially matched to the telephone line impedance,
wherein said second means includes:
a solid state shunt regulator circuit operative to maintain substantially constant voltage across the modem circuits constituting the load, and to limit the voltage drop on the telephone line to ensure a predetermined minimum DC line current; and
a current source operative as a constant current source for AC current and self-adjusting for DC current, and operative to pass DC current to maintain a predetermined AC impedance to match the telephone line.

16. The circuit of claim 15 wherein said second means includes:
a solid state current regulator circuit having a low DC resistance and a sufficiently high AC impedance to maintain an AC impedance substantially matched to that of the telephone line.

17. The circuit of claim 16 wherein the current regulator circuit includes:
a modified Darlington circuit operative to pass DC current and to block AC current.

18. The circuit of claim 15 wherein the shunt regulator circuit includes:
a modified Darlington circuit having complementary transistor types such that the voltage at the base of the first transistor of the Darlington pair tends to equal the voltage at the emitter of the second transistor of the Darlington pair;
a pair of voltage reference diodes connected in series across the output of the Darlington circuit and providing a predetermined reference voltage; and
an input circuit providing an input voltage to the Darlington circuit and operative to establish a selected ratio of regulated output voltages.

19. The circuit of claim 18 wherein one of the voltage reference diodes is a light emitting diode serving as an indicator for denoting an off hook condition.

20. The circuit of claim 18 wherein the shunt regulator circuit further includes:
circuit means operative in response to current above a predetermined level to shunt such current to permit the shunt regulator output voltage to remain substantially constant.

* * * * *